United States Patent
Demange et al.

(10) Patent No.: US 10,605,620 B2
(45) Date of Patent: Mar. 31, 2020

(54) METHOD FOR DETECTING PARASITIC MOVEMENTS DURING STATIC ALIGNMENT OF AN INERTIAL MEASUREMENT UNIT, AND ASSOCIATED DETECTION DEVICE

(71) Applicant: SAFRAN ELECTRONICS & DEFENSE, Boulogne-Billancourt (FR)

(72) Inventors: Jean-Luc Demange, Boulogne-Billancourt (FR); Michel Destelle, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 72 days.

(21) Appl. No.: 15/774,984

(22) PCT Filed: Nov. 10, 2016

(86) PCT No.: PCT/EP2016/077290
§ 371 (c)(1),
(2) Date: May 9, 2018

(87) PCT Pub. No.: WO2017/081166
PCT Pub. Date: May 18, 2017

(65) Prior Publication Data
US 2019/0339095 A1    Nov. 7, 2019

(30) Foreign Application Priority Data
Nov. 10, 2015    (FR) .................................. 15 60760

(51) Int. Cl.
*G01C 25/00* (2006.01)
*G01C 21/16* (2006.01)
*G01S 19/13* (2010.01)

(52) U.S. Cl.
CPC ........... *G01C 25/005* (2013.01); *G01C 21/16* (2013.01); *G01S 19/13* (2013.01)

(58) Field of Classification Search
CPC ........ G01C 25/005; G01C 21/16; G01S 19/13
See application file for complete search history.

(56) References Cited

U.S. PATENT DOCUMENTS

2012/0185205 A1*   7/2012   Rosellini ................ G01C 21/16
                                                                    702/141

FOREIGN PATENT DOCUMENTS

FR    2925670 A1    6/2009
FR    2951535 A1    4/2011
(Continued)

OTHER PUBLICATIONS

Preliminary Research Report and Written Opinion received for French Application No. 1560760, dated Jul. 7, 2016, 8 pages (1 page of French Translation Cover Sheet and 7 pages of original document).

(Continued)

*Primary Examiner* — Manuel L Barbee
(74) *Attorney, Agent, or Firm* — Womble Bond Dickinson (US) LLP

(57) ABSTRACT

The present invention concerns a method for detecting parasitic movements during static alignment of an inertial measurement unit (3), the method being characterised by steps of: receiving radio navigation measurements acquired (100) by a receiver (1) from signals previously transmitted by a set of radio navigation satellites (S), estimating (260) a movement of the inertial measurement unit from the acquired measurements, comparing (280) the estimated movement with a predefined threshold, indicating (290) a parasitic movement of the inertial measurement unit when the movement crosses the predefined threshold, in which the (Continued)

estimation (260) of the movement of the inertial measurement unit (3) from the acquired measurements comprises the following steps, implemented by the data processing unit for each satellite: calculating (262) a position variation from a phase of a first radio navigation signal transmitted by the satellite and received by the receiver at an initial reception time, and from a phase of a second radio navigation signal emitted by the satellite and received by the receiver at a subsequent reception time, estimating (264) a movement of the receiver relative to the satellite between the initial reception time and the subsequent reception time, calculating (266) a deviation between the calculated position variation and the estimated movement of the receiver relative to the satellite, the estimated movement of the inertial measurement unit depending on this deviation.

14 Claims, 3 Drawing Sheets

(56) References Cited

FOREIGN PATENT DOCUMENTS

| WO | 2004/034077 A2 | 4/2004 |
| WO | 20061025825 A1 | 3/2006 |

OTHER PUBLICATIONS

International Search Report and Written Opinion received for PCT Patent Application No. PCT/EP2016/077290, dated Feb. 16, 2017, 17 pages (8 pages of English Translation and 9 pages of Original Document).

International Preliminary Report on Patentability received for PCT Patent Application No. PCT/EP2016/077290, dated May 24, 2018, 15 pages (8 pages of English Translation and 7 pages of Original Document).

* cited by examiner

METHOD FOR DETECTING PARASITIC MOVEMENTS DURING STATIC ALIGNMENT OF AN INERTIAL MEASUREMENT UNIT, AND ASSOCIATED DETECTION DEVICE

FIELD OF THE INVENTION

The present invention relates to a method for detecting parasitic movements during static alignment of an inertial unit, and a device for implementing such a method.

PRIOR ART

An inertial unit is a device configured to track the state of movement of a carrier, and this by means of measurements provided by inertial sensors on board the carrier.

The alignment of an inertial unit is an initialization phase during which initial values of attitude, speed and position of the inertial unit are calculated.

Two categories of alignments of inertial unit stand out:
static alignment, during which the carrier is immobile,
alignment in motion, during which the mobile carrier moves relative to the earth.

During static alignment, the movements of the carrier degrade the accuracy of the initialization of the navigation.

It has been proposed to detect these parasitic movements to verify the immobility of the carrier during static alignment.

These detection methods exploit inertial measurements provided by the inertial sensors of the inertial unit for detecting parasitic movements of the carrier. The applicant has especially proposed such a method in document FR 2 951 535 A1.

However, the inertial sensors prove ineffective for detecting some specific movements.

In particular, current inertial sensors, with limited accuracy, fail to detect low-frequency oscillatory movements, to which for example an oil platform or a helicopter pad on the roof of a skyscraper are subjected.

On the other hand, inertial sensors, which generally measure variations in speed, do not detect uniform rectilinear displacement of the carrier during static alignment (for example, an inertial measurement navigation unit of an aircraft sitting on a ship in a calm sea).

Document WO 2006/025825 also discloses a method for detecting parasitic movements during static alignment of an inertial unit based on measuring a GPS autonomous ground speed. But this method is not precise enough for allowing detection of the abovementioned highly particular movements: uniform rectilinear displacement, low-frequency oscillations.

EXPLANATION OF THE INVENTION

An aim of the invention is to detect low-frequency oscillatory movements or uniform rectilinear movements of an inertial unit during static alignment of this inertial unit.

It is thus proposed, according to a first aspect of the invention, a method for detecting parasitic movements during static alignment of an inertial unit, comprising steps of:
receiving radio navigation measurements acquired by a receiver from signals previously transmitted by a set of radio navigation satellites,
estimating a displacement of the inertial unit from the measurements acquired,
comparing the estimated displacement with a predetermined threshold,
signaling a parasitic movement of the inertial unit when the displacement crosses the predetermined threshold.
wherein estimation of displacement of the inertial unit from the acquired measurements comprises the following steps, conducted for each satellite:
calculation of a position variation from:
a phase of a first radio navigation signal transmitted by the satellite and received by the receiver at an initial reception time, and
a phase of a second radio navigation signal transmitted by the satellite and received by the receiver at a subsequent reception time,
estimation of a displacement of the receiver relative to the satellite between the initial reception time and the subsequent reception time,
calculation of a deviation between calculated variation in position and the estimated displacement of the receiver relative to the satellite, the estimated displacement of the inertial unit depending on this deviation.

The measurements provided by the signal receiver detect geographic displacements of the class of one centimeter per second. These measurements constitute input data much more effective than inertial measurements for estimating displacement of the inertial unit, in particular estimating displacement caused by low-frequency oscillatory or uniform rectilinear movement.

In particular, the sub-steps of the estimation step of displacement of the inertial unit, based on phases received at different times allows achieving much greater accuracy than an estimation based on a GPS autonomous ground speed. These phases constitute data for estimating displacement of the inertial unit particularly accurately; the accuracy of the discrimination between parasitic and non-parasitic movements is also higher.

The detection method according to the invention can further comprise the following optional characteristics, taken singly or else in combination whenever technically possible.

The set can comprise at least four satellites. With such a number of satellites, it is possible to determine potentially parasitic displacement of the inertial unit in three spatial directions as well as the variation in time bias of the receiver (so four unknowns), and this without any assumption on displacement of the unit or on the accuracy of the receiver used.

In an embodiment, the two items of information are a phase of the first signal and a phase of the second signal.

The initial reception times can be substantially identical for all the satellites, and the subsequent reception times can substantially identical for all the satellites. The effect here is to increase accuracy of the estimation of displacement and therefore detect very delicate movements.

The displacement of the unit can further be estimated by a least square method applied to the different deviations calculated.

The displacement of the receiver relative to one of the satellites between the initial reception time and the subsequent reception time can be estimated from the following data:
a position of the satellite at the initial reception time,
a position of the satellite at the subsequent reception time,
a position at the initial reception time provided by the inertial unit, and
a position at the subsequent reception time provided by the inertial unit.

Also, for each radio navigation signal transmitted by one of the satellites, it can be provided that navigation measurements comprise a position of the satellite at a transmission time by the satellite, and that the position of the satellite at the reception time of said signal is calculated from the position of the satellite at the transmission time of the same signal.

The position of the satellite at the transmission time can be expressed in a terrestrial frame of the reception time, and be calculated by multiplication of a vector of coordinates of the satellite at the transmission time, the coordinates being expressed in the terrestrial frame at the transmission time, by a matrix representative of rotation of the terrestrial frame during propagation of the radio navigation signal from the satellite to the receiver, between the transmission time and the reception time.

The method can further comprise reception of a message of start-up of alignment of the inertial unit, each signal received at an initial time being the first signal received by the receiver originating from one of the satellites, after reception of the start-up message. This allows detecting parasitic movements occurring at the very beginning of static alignment.

The estimation of the displacement of the inertial unit from the acquired measurements can further comprise calculation, for each satellite, of a variation, between the initial reception time and the subsequent reception time, of the direction cosine of a sight line connecting the receiver to the satellite, displacement of the estimated inertial unit depending on the variation in calculated direction cosine. As the satellite moves relative to the carrier of the inertial unit between the initial reception time and the subsequent reception time, the sight line between the reception and this satellite can also move in this time interval. Considering the variation of direction cosine of the sight line therefore further improves the accuracy of the estimation of displacement of the inertial unit during this period, and accuracy of discrimination between parasitic and non-parasitic movements of the method is therefore further increased.

The method can also comprise verification of the validity of measurements acquired by the receiver, the estimation step of displacement being conducted selectively on the basis of measurements declared valid. This thereby allows avoiding problems of false alarm or missed detection of parasitic movement due to breakdown in radio navigation signals received.

According to a second aspect of the invention a method of static alignment of an inertial unit is proposed, comprising steps of:
  detection of a parasitic movement of the inertial unit by means of the method according to one of the preceding claims during the static alignment,
  in response to the detection, suspension of the alignment, or reconfiguration of at least one alignment parameter used to align the inertial unit, as a function of the parasitic movement detected.

According to a third aspect of the invention, a device for detecting parasitic movements during static alignment of an inertial unit is proposed, the device comprising:
  an input for receiving navigation measurements acquired by a receiver of radio navigation signals previously transmitted by a set of radio navigation satellites,
  a data-processing unit configured for:
    estimating a displacement of the inertial unit from the navigation measurements acquired,
    comparing the estimated displacement with a predetermined threshold,
    an output for transmitting data signaling a parasitic movement of the inertial unit when the displacement crosses the predetermined threshold.

This device can further comprise a radio navigation receiver configured to acquire radio navigation measurements from radio navigation signals previously transmitted by a satellite and configured to transmit said measurements to the data-processing unit.

According to a fourth aspect of the invention, a system is proposed, comprising:
  a detection device according to one of claims according to the third aspect of the invention, and
  a navigation unit configured to implement static alignment of an inertial unit as a function of a parasitic movement detected by the detection device.

According to a fifth aspect of the invention, a computer program product is proposed comprising program code instructions for execution of the steps of the method according to the first aspect of the invention, when this program product is executed by at least one data-processing unit.

DESCRIPTION OF THE FIGURES

Other characteristics, aims and advantages of the invention will emerge from the following description which is purely illustrative and non-limiting, and which must be considered with respect to the appended drawings, in which.

In all figures, similar elements bear identical reference numerals.

DETAILED DESCRIPTION OF THE INVENTION

Figure 1:
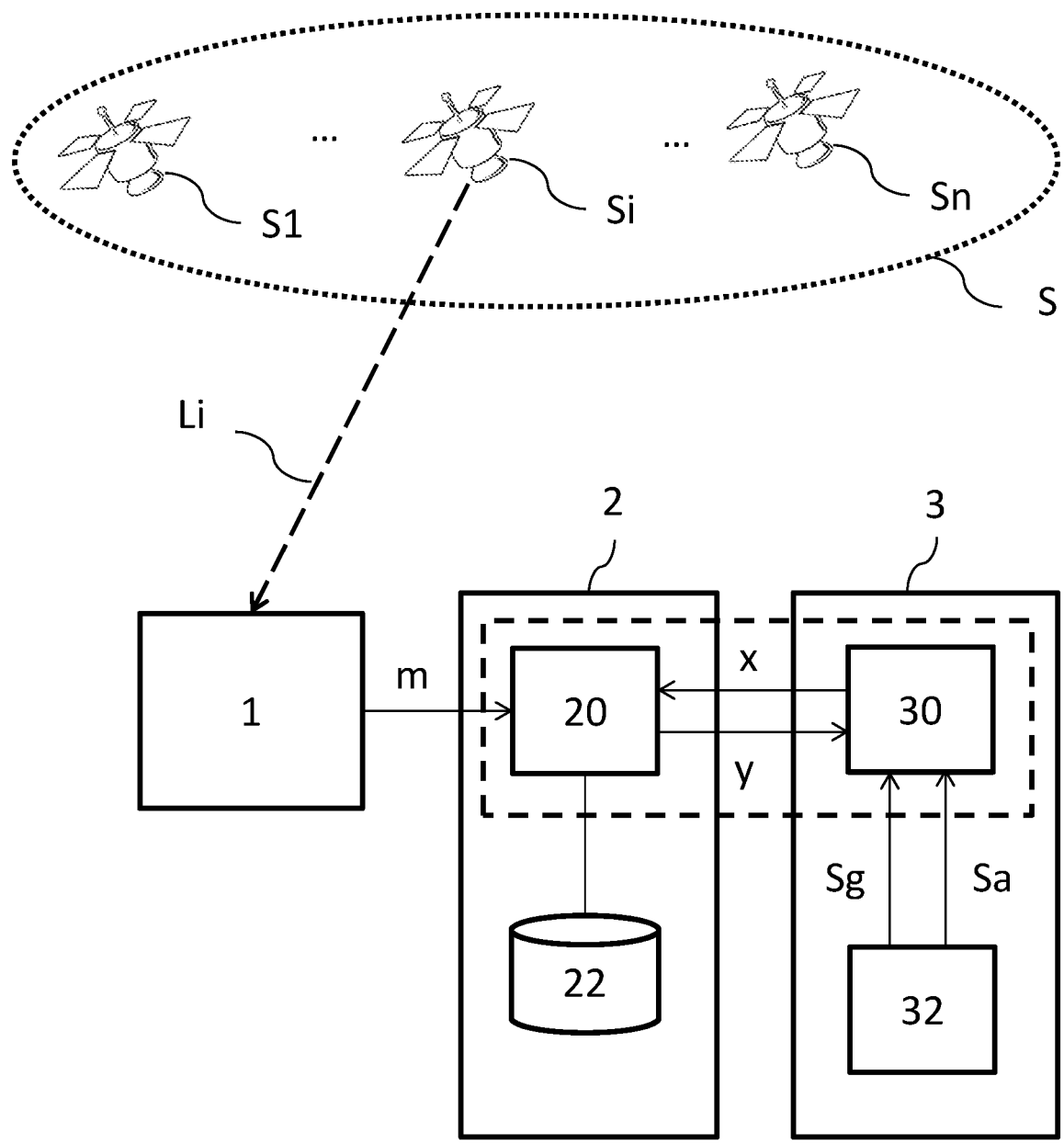
FIG. 1 schematically illustrate an inertial unit and a device for detecting parasitic movements according to an embodiment of the invention.

In reference to FIG. 1, a system comprises a receiver 1, a device 2 for detecting parasitic movements, and an inertial unit 3.

The system is on board a mobile carrier such as a vehicle, a ship or an aircraft.

The signal receiver 1 is known per se. This receiver 1 comprises one or more antennas configured to capture signals emanating from a set S of radio navigation satellites S1 to Sn, for example signals of GPS or GNSS or GALILEO type. The receiver 1 further comprises means for producing measurements from the signals received by the antennas of the receiver 1.

The receiver 1 is for example configured with a predetermined sampling frequency.

The receiver 1 further comprises resetting means known per se, configured for temporarily resetting the measurements transported by the different radio navigation signals relative to each other.

The receiver 1 can form part of the detection device 2 or else constitute an autonomous component capable of communicating with the detection device 2, as shown in FIG. 1.

The inertial unit 3 comprises a navigation unit 30 and inertial sensors 32.

The navigation unit 30, known per se, is especially configured to implement static alignment of the inertial unit 3 according to a method known from the prior art. The navigation unit 30 comprises for example at least one processor configured to execute a static alignment algorithm.

The inertial sensors 32 comprise for example accelerometers providing measurements Sa and/or gyrometers providing measurements Sg.

The inertial unit 3 can also comprise a user interface.

The detection device 2 is configured to detect parasitic movements during static alignment implemented by the navigation unit 30 of the inertial unit 3.

The detection device 2 comprises an input configured to receive measurements acquired by the receiver 1 of signals transmitted by the set of radio navigation satellites S.

The detection device 2 further comprises a data-processing unit 20 and means for communicating with the navigation unit 30 of the inertial unit 3.

The communication means are bidirectional, comprising an input configured to receive data $\chi$ emanating from the navigation unit 30, an output configured to transmit data $\gamma$ produced by the processing unit 20 to the navigation unit 30.

The data-processing unit 20 typically comprises at least one processor for running a computer program. This computer program comprises program code instructions configured to implement a method for detecting parasitic movements of the inertial unit 3 during its static alignment, when these instructions are executed by the processor of the processing unit 20.

Also, the data-processing unit 20 and the navigation unit 30 can be physical components, autonomous or combined within the same casing.

The detection device 2 also comprises a memory 22 for storing data, especially measurements received from the receiver 1.

Figure 2:
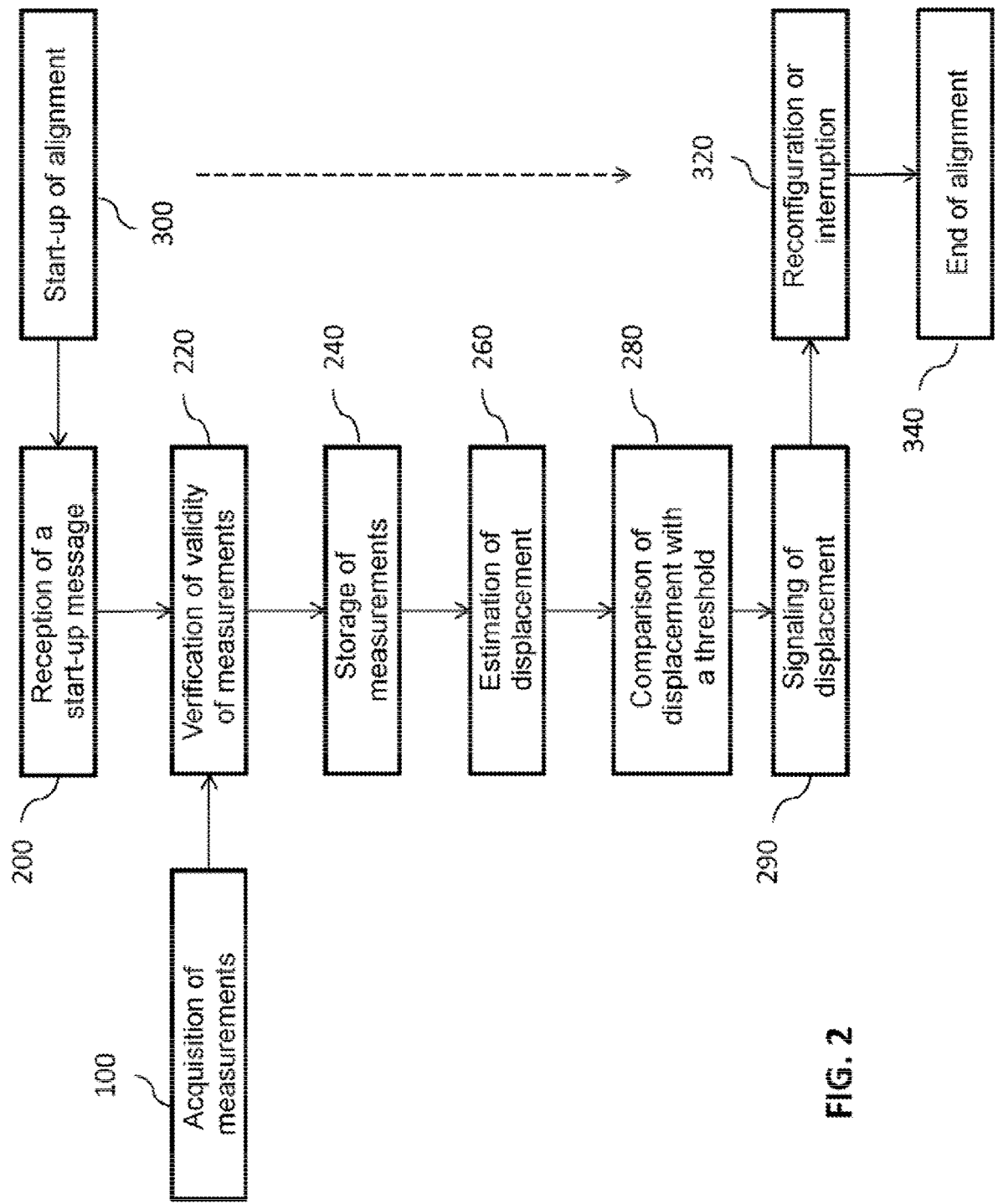
FIGS. 2 and 3 illustrate steps of a method for detecting parasitic movements performed by the device shown in FIG. 1, according to an embodiment of the invention.

In reference to FIG. 2, the system shown in FIG. 1 operates as follows.

Each of the radio navigation satellites of the set S, conventionally noted Si, transmits successive radio navigation signals. Each radio navigation signal is characterized by a transmission time. This transmission timing is provided in the transmitted signal.

When the receiver 1 is in view of one of the radio navigation satellites Si along a sight line Li, the receiver 1 receives the successive signals transmitted by this satellite at different reception times and acquires 100 successive navigation measurements from the received signals.

Hereinbelow, a radio navigation measurement noted Mi designates a set of data relative to a signal transmitted by a given satellite Si among the satellites of the set S, signal received by the receiver 1 at a given reception time. In this way, a radio navigation measurement Si is characterized by: the identifier of the transmitting satellite Si belonging to the set S, a transmission time of this signal by this satellite, a reception time by the receiver 1 of this signal, and information transported by this signal.

A given radio navigation measurement Mi especially comprises data representative of the phase of the corresponding signal received by the receiver 1.

A given radio navigation measurement Mi also comprises an item of position information of the transmitting satellite Si dated on the transmission time of the signal transmitted by this satellite. This position is usually expressed in the form of Cartesian coordinates in a terrestrial frame, i.e., a fixed reference frame relative to the earth.

The set of radio navigation measurements Mi corresponding to the satellites of the set S acquired 100 by the receiver 1 is transmitted to the processing unit 20 of the detection device 2. Each measurement is time-stamped with the reception time of the corresponding signal by the receiver 1.

The receiver 1 produces the radio navigation measurements by means of a predetermined sampling frequency. In this way, two radio navigation signals transmitted by two different satellites Si and Sj reaching the receiver 1 at close time points (the deviation of which is less than the sampling period of the receiver 1) can produce two measurements time-stamped with the same reception time by the receiver 1. These two signals are considered as simultaneous hereinbelow. In this respect, the readjusting means of the receiver 1 correct the information transported by the radio navigation signals so as to consider the sampling conducted.

At a given time, the navigation unit 30 triggers 300 a static alignment method of the inertial unit 3.

The navigation unit 30 generates a message indicating start-up of static alignment and transmits this message to the processing unit 20 of the detection device 2.

On reception 200 of the start-up message, the processing unit 20 implements a method for detecting parasitic movements during static alignment.

The processing unit 20 verifies 220 the validity of the radio navigation measurements it receives from the receiver 1, and in particular the validity of phase information contained in these measurements. If a measurement is declared invalid, the measurement will not be used by the processing unit 20. If the measurement is declared valid, the measurement is usable by the processing unit 20.

This verification 220 does not degrade detection of parasitic movements because of erroneous information contained in the measurements provided by the receiver 1.

The verification 220 is preferably triggered after reception by the processing unit 20 of the start-up message of the alignment phase of the inertial unit 3.

The processing unit 20 stores 240 the radio navigation measurements it receives from the receiver 1, for example selectively those measurements declared valid on completion of the verification 220.

By convention, "set of initial radio navigation measurements" will be called the set of the first radio navigation measurements Mi worked out from the signals transmitted by the satellites Si of the set S and stored by the processing unit 20 after the time when the processing unit 20 has received the alignment start-up message. The reception time by the receiver 1 of these measurements from which the initial measurements have come is further called "initial reception time" or more simply "initial time", and this time is noted $t_{start\_aln}^{r}$.

A second set of radio navigation measurements is further considered, conventionally known as "set of subsequent radio navigation measurements" stored by the processing unit 20, subsequent to the initial set of measurements, and coming from the radio navigation signals transmitted by the satellites Si of the set S and received by the receiver 1 at a time $t^r$ subsequent to the initial time $t_{start\_aln}^{r}$.

For each of the satellites Si there is $$\Delta t = t^r - t_{start\_aln}^{r}$$

In other words, the initial reception times are substantially identical for all the satellites Si, and the subsequent reception times are substantially identical for all the satellites Si.

Figure 3:
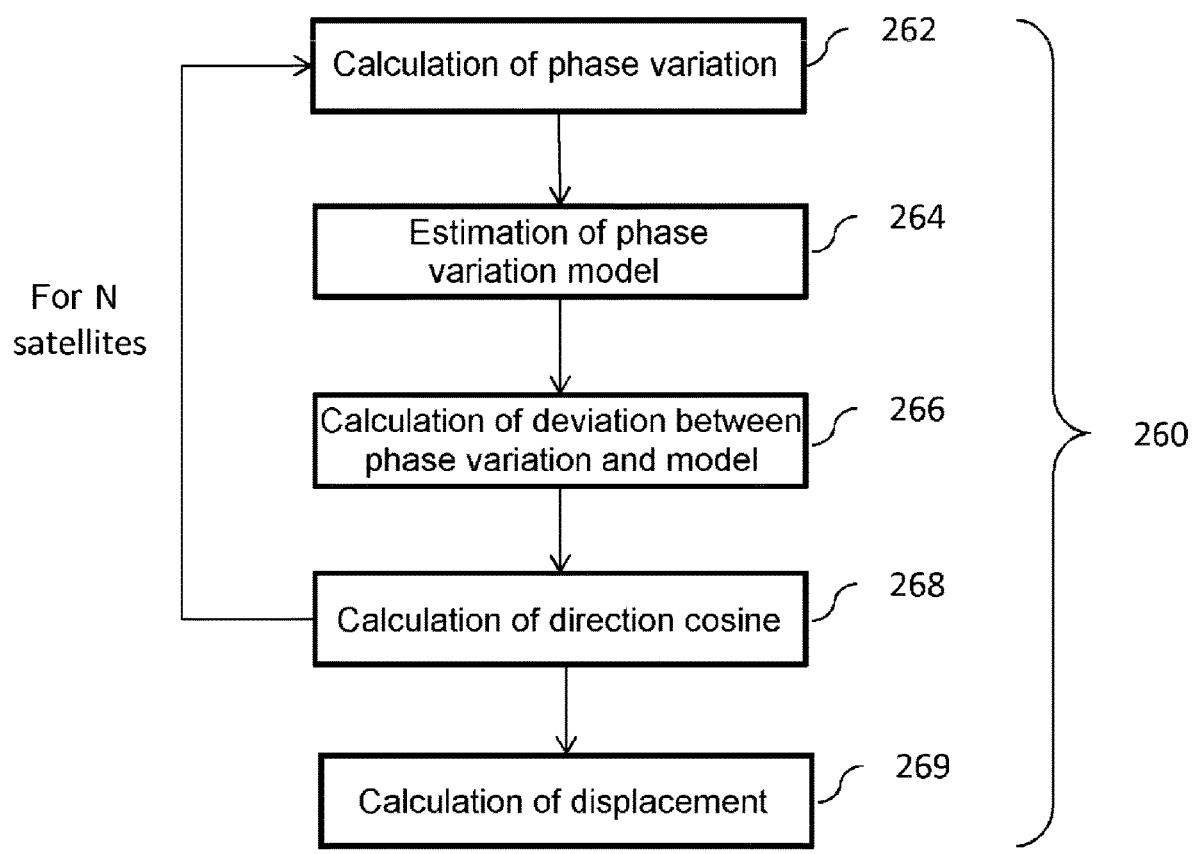

In reference to FIG. 3, estimation 260 of the displacement comprises the following steps.

From all the initial radio navigation measurements on the one hand and from all the subsequent radio navigation measurements on the other hand, and for each of the satellites Si of the set S, the processing unit 20 calculates 262 a position variation measurementDR$_i$(t$^r$) between the signal transmitted by the satellite Si, received at the initial reception time t$_{start\_aln}$$^r$ and the signal transmitted by the satellite Si, received at the subsequent reception time t$^r$.

For a given satellite Si, the associated position variation is a function of two items of information: an item of information Info$_i$(t$_{start\_aln}$$^r$) included in the initial stored measurement coming from the satellite Si, and an item of information Info$_i$(t$_{start\_aln}$$^r$+Δt) included in the subsequent and corresponding stored measurement coming from the satellite Si.

The position variation is therefore calculated according to the following general formula:

$$\text{measurement}DR_i(t^r) = f(\text{Info}_i(t^r), \text{Info}_i(t^r_{start\_aln}))$$
$$= f(\text{Info}_i(t^r_{start\_aln} + \Delta t), \text{Info}_i(t^r_{start\_aln}))$$

In an embodiment particularly advantageous in terms of accuracy in the results obtained, the two items of information Info$_i$ are phases ø$_i$. The general formula hereinabove is then:

$$\text{measurement}DR_i(t^r) = f(\phi_i(t^r_{start\_aln} + \Delta t), \phi_i(t^r_{start\_aln}))$$
$$= \frac{\lambda_i}{2\pi}(\phi_i(t^r_{start\_aln} + \Delta t) - \phi_i(t^r_{start\_aln}))$$

where λ$_i$ is the wavelength of the signals transmitted by the satellite Si.

Such position variation is also called "delta-range" in the literature.

In other embodiments of step 262, the two items of information are pseudo-speeds or pseudo ranges worked out by the receiver 1.

Also, the processing unit 20 estimates 264, for each satellite Si, a displacement of the receiver 1 relative to the satellite Si between the initial reception time t$_{start\_aln}$$^r$ and the subsequent reception time t$^r$.

In an embodiment, the displacement of the receiver 1 relative to the satellite Si is calculated 264 on the basis of information of the following positions:

the position of the satellite Si at the initial reception time t$_{start\_aln}$$^r$, noted $$PS_i(t^{e_i}_{start\_aln}),$$
$$[T\_t^r_{start\_aln}]$$

where $\lfloor T\_t_{start\_aln}{}^t \rfloor$ represents the terrestrial frame at the initial reception time t$_{start\_aln}$$^r$ the position of the satellite Si at the subsequent reception time t$^r$, noted $$PS_i(t^{e_i}),$$
$$[T\_t^r]$$

where $\lfloor T\_t_u{}^r \rfloor$ represents the terrestrial frame at the subsequent reception time t$_{start\_aln}$$^r$ a position of the inertial unit 3 at the initial reception time t$_{start\_aln}$$^r$, noted $$PI,$$
$$[T\_t^r_{start\_aln}]$$

and a position of the inertial unit 3 at the subsequent reception time t$^r$, noted $$PI$$
$$[T\_t^r]$$

Calculation 264 performed on the basis of this information can then be the following:

$$\text{model } DR_i(t^r) = \left\| \begin{array}{c} PI \\ [T\_t^r] \end{array} - \begin{array}{c} PS_i(t^{e_i}) \\ [T\_t^r] \end{array} \right\| - \left\| \begin{array}{c} PI \\ [T\_t^r_{start\_aln}] \end{array} - \begin{array}{c} PS_i(t^{e_i}_{start\_aln}) \\ T\_[t^r_{start\_aln}] \end{array} \right\|$$

The displacement of the receiver 1 relative to the satellite Si is a distance mainly marred by clock errors of the receiver 1.

The two positions of the inertial unit 3 are calculated by means of measurements provided by the inertial sensors 32 of the inertial unit 3 (typically acceleration measurements Sa, and angular speed measurements Se).

The position of the satellite Si:

$$PS_i(t^{e_i}_{(...)})$$
$$[T\_t^r_{(...)}]$$

at a transmission time t$_{(...)}$$^{e_u}$ of a signal transmitted by this satellite is calculated from the position:

$$PS_i(t^{e_i}_{(...)})$$
$$[T\_t^{e_i}_{(...)}]$$

of the satellite S at the time t$_{(...)}$$^{e_i}$ where the satellite Si has transmitted this signal, as follows:

$$\begin{array}{c} PS_i(t^{e_i}_{(...)}) \\ [T\_t^r_{(...)}] \end{array} = \begin{bmatrix} \cos\theta_i & \sin\theta_i & 0 \\ -\sin\theta_i & \cos\theta_i & 0 \\ 0 & 0 & 1 \end{bmatrix} \cdot \begin{array}{c} PS_i(t^{e_i}_{(...)}) \\ [T\_t^{e_i}_{(...)}] \end{array}$$

In this equation, the two positions of the satellite Si are in the form of vectors of coordinates expressed in the terrestrial frame previously mentioned. The position vector of the satellite Si at the transmission time t$_{(...)}$$^{e_i}$ is multiplied by a matrix representative of a rotation of the terrestrial frame during propagation of the navigation signal between the transmission time t$_{(...)}$$^{e_i}$ and the reception time t$_{(...)}$$^r$, so as to produce the position vector of the satellite S at the reception time t$_{(...)}$$^r$.

The processing unit 20 then calculates 266 a deviation, or innovation, between the position variation calculated in step 262 and the displacement estimated in step 264:

innoDR$_i$(t$^r$)=measurementDR$_i$(t$^r$)−modelDR$_i$(t$^r$)

Also, the processing unit 20 calculates a variation, between the initial reception time t$_{start\_aln}$$^r$ and the subsequent reception time $t^r$, in the direction cosine of the sight line Li connecting the receiver 1 to the satellite Si.

This variation of direction cosine, noted $\Delta u_i(t^r)$ is also expressed as a vector of coordinates in the abovementioned terrestrial frame, resulting from the following calculation 268:

$$\Delta u_i(t^r) = \begin{bmatrix} \Delta u_{i\_x}(t^r) \\ \Delta u_{i\_y}(t^r) \\ \Delta u_{i\_z}(t^r) \end{bmatrix} = \frac{\overrightarrow{PI - PS_i(t^{e_i})}_{[T\_t^r]}}{\left\| \overrightarrow{PI - PS_i(t^{e_i})}_{[T\_t^r]} \right\|} - \frac{\overrightarrow{PI - PS_i(t^{e_i}_{start\_aln})}_{[T\_t^r_{start\_aln}]}}{\left\| \overrightarrow{PI - PS_i(t^{e_i}_{start\_aln})}_{[T\_t^r_{start\_aln}]} \right\|}$$

At this stage the processing unit 20 has a set of n innovations (or deviations): innoDR_i($t^r$) and a set of n variations of direction cosine: $\Delta u_i(t^r)$ between the two reception times $t^r$ and $t_{start\_aln}^r$, each innovation coming from measurements originating from a different satellite Si, as well as each variation of direction cosine.

The processing unit 20 estimates 269 the displacement of the inertial unit 3 from the initial time $t_{start\_aln}^r$ by means of the n innovations and of the n variations of direction cosine.

Four values can be determined to fully characterize the displacement of the inertial unit: three components of the displacement of the inertial unit in three spatial directions from the initial time $t_{start\_aln}^r$ and the variation in time bias of the receiver 1 from the initial time $t_{start\_aln}^r$.

In an embodiment, the processing unit 20 estimates 269 the displacement of the inertial unit 3 from the initial time $t_{start\_aln}^r$ along the three axes x, y, z of the mark $$[T\_t^r] : \Delta r(t^r) = \begin{bmatrix} \Delta r\_x(t^r) \\ \Delta r\_y(t^r) \\ \Delta r\_z(t^r) \end{bmatrix},$$

as well as the variation in time bias of the receiver from the initial time: $\Delta b(t^r)$ at each reception time $t^r$ from the set of deviations calculated: innoDR_i($t^r$) and the set of variations of associated direction cosines: $\Delta u_i(t^r)$.

The processing unit 20 uses for example a least square algorithm for this displacement calculation. For this to happen, the processing unit 20 builds the following matrix H($t^r$) from the set of associated variations of direction cosine:

$$H(t^r) = \begin{bmatrix} \Delta u_{1\_x}(t^r) & \Delta u_{1\_y}(t^r) & \Delta u_{1\_z}(t^r) & 1 \\ \vdots & \vdots & \vdots & 1 \\ \Delta u_{n\_x}(t^r) & \Delta u_{n\_x}(t^r) & \Delta u_{n\_z}(t^r) & 1 \end{bmatrix}$$

The processing unit 20 estimates the displacement of the inertial unit 3 as follows:

$$\begin{bmatrix} \Delta r\_x(t^r) \\ \Delta r\_y(t^r) \\ \Delta r\_z(t^r) \\ \Delta b(t^r) \end{bmatrix} = ({}^tH(t^r)H(t^r))^{-1}{}^tH(t^r) \begin{bmatrix} innoDR_1(t^r) \\ \vdots \\ innoDR_n(t^r) \end{bmatrix}$$

In the embodiment of step 269 described hereinabove, it will be noted that four deviations depending on measurements coming from four different satellites Si have been used. This allows determining directly the four unknowns which are the movements of the inertial unit along the axes x, y, z from the initial time, as well as the variation in time bias of the receiver 1 from the initial time, via four equations.

It is however possible to use a number n of satellites less than 4 to perform this calculation, by way of additional assumptions concerning some of the four above unknowns. For example, in some static alignment contexts, it can be assumed that displacement of the inertial unit along at least one of the axes of the above reference frame (for example the axis z) is zero. In this case, the implemented method will obviously determine no movement of the unit, potentially parasitic, along this axis. Also, the fourth unknown constituted by the variation in time bias of the receiver 1 can be considered zero when the receiver 1 has a sufficiently precise clock such as an atomic clock.

In a particular variant of the method, temporal prefiltering on calculated deviations or innovations is performed to decrease for example environmental noises generated by the carrier.

Referring again to FIG. 2, the processing unit 20 compares for example 280 the estimated standard of displacement $\|\Delta r(t^r)\|$ (or any other function worked out from its components) to one or more predetermined thresholds. Advantageously, these thresholds are selected as a function of the statistic(s) of the residual noise on the phase measurements acquired by the receiver 1 for a carrier considered in a static state and for a probability of false alarm associated with this test. Several statistics can be necessary to consider factors influential on residual noise such as the influence of elevation of the satellite Si via the tropospheric propagation error.

If estimated displacements prove to be less than the thresholds, these displacements are considered as being negligible movements.

If estimated displacements prove to be greater than or equal to the thresholds, these displacements are considered as being parasitic movements likely to harm the proper alignment of the inertial unit still underway. In this second case, the processing unit 20 generates a signal message of this parasitic movement which it transmits 290 to the navigation unit 30, which is still in the process of performing alignment of the inertial unit 3.

On reception of this signaling message, the navigation unit 30 can adopt several strategies 320.

A first strategy is to interrupt the alignment underway.

A second strategy is to continue alignment while considering the parasitic movement which has just been detected; for example, the navigation unit 30 reconfigures at least one alignment parameter used by the alignment algorithm, from the displacement Or estimated by the processing unit 20 and considered as parasitic.

Alignment ends 340 like this prematurely, or after having considered the parasitic movement detected.

The invention claimed is:
1. A method for detecting parasitic movements during static alignment of an inertial unit comprises:
   receiving radio navigation measurements acquired by a receiver from signals previously transmitted by a set of radio navigation satellites,
   estimating a displacement of the inertial unit from the measurements acquired,
   comparing the estimated displacement with a predetermined threshold, signaling a parasitic movement of the inertial unit when the displacement crosses the predetermined threshold, wherein estimation of displacement of the inertial unit from the acquired measurements comprises the following steps, conducted for each satellite:

calculation of a position variation from:
a phase of a first radio navigation signal transmitted by the satellite and received by the receiver at an initial reception time, and
a phase of a second radio navigation signal transmitted by the satellite and received by the receiver at a subsequent reception time, estimation of a displacement of the receiver relative to the satellite between the initial reception time and the subsequent reception time, calculation of a deviation between calculated variation in position and the estimated displacement of the receiver relative to the satellite, the estimated displacement of the inertial unit depending on this deviation, wherein the displacement of the receiver relative to one of the satellites between the initial reception time and the subsequent reception time is estimated from the following data:

a position of the satellite at the initial reception time,
a position of the satellite at the subsequent reception time,
a position at the initial reception time provided by the inertial unit, and
a position at the subsequent reception time provided by the inertial unit.

2. The method according to claim 1, further comprising:
reception of a message of startup of alignment of the inertial unit, each signal received at an initial time being the first signal received by the receiver originating from one of the satellites, after reception of the startup message.

3. The method according to claim 1, wherein estimation of the displacement of the inertial unit from the acquired measurements comprises the following sub-step conducted for each satellite:
calculation of a variation, between the initial reception time and the subsequent reception time, of the direction cosine of a sight line connecting the receiver to the satellite, displacement of the estimated inertial unit depending on the variation in calculated direction cosine.

4. The method according to claim 3, wherein the set comprises at least four satellites.

5. The method according to claim 1, wherein the initial reception times are substantially identical for all the satellites, and the subsequent reception times are substantially identical for all the satellites.

6. The method according to claim 1, wherein the displacement of the unit is estimated by a least square method applied to the different deviations calculated.

7. The method according to claim 1, wherein, for each radio navigation signal transmitted by one of the satellites, the navigation measurements comprise a position of the satellite at a transmission time by the satellite, the position of the satellite at the reception time of said signal is calculated from the position of the satellite at the transmission time of the same signal.

8. The method according to claim 7, wherein the position of the satellite at the transmission time is expressed in a terrestrial frame of the reception time, and is calculated by multiplication of:

a vector of coordinates of the satellite at the transmission time, the coordinates being expressed in the terrestrial frame at the transmission time, by
a matrix representative of rotation of the terrestrial frame during propagation of the radio navigation signal from the satellite to the receiver, between the transmission time and the reception time.

9. The method according to claim 1, comprising verification of the validity of measurements acquired by the receiver, the estimation step of the displacement being conducted selectively on the basis of measurements declared valid.

10. A method of static alignment of an inertial unit comprising steps of:
detection of a parasitic movement of the inertial unit by means of the method according to claim 1 during the static alignment,
in response to detection, suspension of the alignment, or reconfiguration of at least one alignment parameter used to align the inertial unit, as a function of the parasitic movement detected.

11. A non-transitory computer-readable medium comprising program code instructions stored thereon for execution of the steps of the method according to claim 1, when the non-transitory computer-readable medium is read by at least one data-processing unit.

12. A device for detecting parasitic movements during static alignment of an inertial unit, the device comprising:
an input for receiving navigation measurements acquired by a receiver of radio navigation signals previously transmitted by a set of radio navigation satellites,
a data-processing unit configured for:
estimating a displacement of the inertial unit from the navigation measurements acquired,
comparing the estimated displacement with a predetermined threshold,
an output for transmitting data signaling a parasitic movement of the inertial unit when the displacement crosses the predetermined threshold,
wherein estimation of the displacement of the inertial unit from the acquired measurements comprises the following steps, conducted by the data-processing unit for each satellite:
calculation of a position variation from:
a phase of a first radio navigation signal transmitted by the satellite and received by the receiver at an initial reception time, and
a phase of a second radio navigation signal transmitted by the satellite and received by the receiver at a subsequent reception time,
estimation of a displacement of the receiver relative to the satellite between the initial reception time and the subsequent reception time,
calculation of a deviation between calculated variation in position and the estimated displacement of the receiver relative to the satellite, the estimated displacement of the inertial unit depending on this deviation,
wherein the displacement of the receiver relative to one of the satellites between the initial reception time and the subsequent reception time is estimated from the following data:
a position of the satellite at the initial reception time,
a position of the satellite at the subsequent reception time,
a position at the initial reception time provided by the inertial unit, and
a position at the subsequent reception time provided by the inertial unit.

13. The device according to claim 12, further comprising a radio navigation receiver configured to acquire radio navigation measurements from radio navigation signals previously transmitted by a satellite and configured to transmit said measurements to the data-processing unit.

14. A system comprising:
  a detection device according to claim 12,
  a navigation unit configured to implement static alignment of an inertial unit as a function of parasitic movement detected by the detection device.

* * * * *